March 22, 1949.    H. C. COOMBES    2,465,201
VARIABLE RATIO GEAR DRIVE
Filed Feb. 15, 1946

Inventor
Hector Charles Coombes
His Attorney

Patented Mar. 22, 1949

2,465,201

UNITED STATES PATENT OFFICE 2,465,201

VARIABLE RATIO GEAR DRIVE

Hector Charles Coombes, Sydney, New South Wales, Australia

Application February 15, 1946, Serial No. 647,884
In Australia November 6, 1945

7 Claims. (Cl. 74—781)

This invention relates to variable ratio gear drives such as are used for winches, motor vehicles and other mechanisms requiring a variable torque: load drive, and the object thereof is to provide a transmission which will automatically select the most advantageous transmission speed ratio, within its limits of operation, according to the load to be overcome at any instant.

Within its limits of low and high transmission ratio, any ratio whatever can be selected as the gear is infinitely variable and is not limited by a series of fixed transmission ratios. It is a characteristic of the gear that it will select the highest possible ratio which will overcome the applied load.

In order to describe the invention in detail reference is made to the accompanying drawings which depict an embodiment thereof as applied to winch work, and in which.

Figure 1:
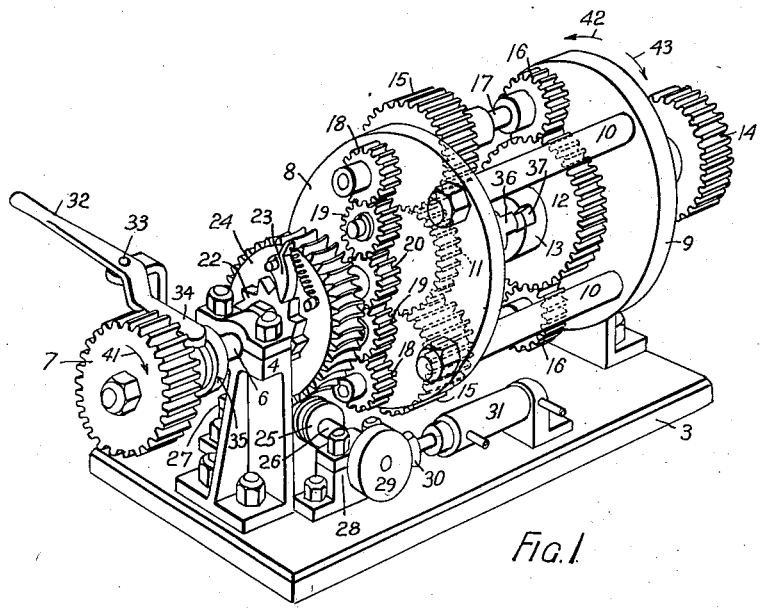
Fig. 1 is a perspective view.
Figure 2:
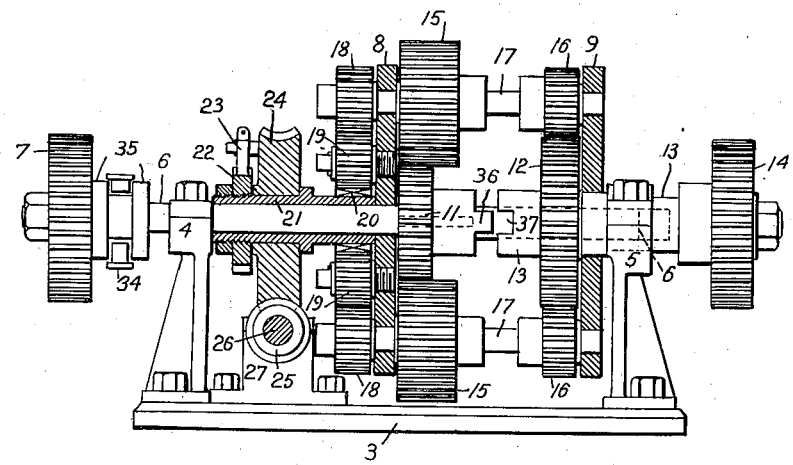
Fig. 2 is a longitudinal cross-sectional elevation of the gear.

The base 3 carries pedestal bearings 4 and 5. Driving shaft 6 is mounted directly in bearing 4 and extends through bearing 5, and driving coupling gear 7 is mounted on its outer end.

The cage plates 8, 9 of an epicyclic gear are rotatably mounted about driving shaft 6, and are united as a unit by distance bolts 10, 10. A driving spur gear 11 is keyed to driving shaft 6 directly inside cage plate 8, and a driven spur gear 12 having an integral extended sleeve 13 is rotatably mounted about shaft 6, directly inside cage plate 9. Sleeve 13 rotatably extends through cage plate 9 and bearing 5, and on its outer end is keyed driven coupling gear 14.

Driving spur gear 11 is connected with driven spur gear 12 through two duplicate sets of planetary gears mounted in the cage and each comprising a planet gear 15 meshing with spur gear 11 and a planet gear 16 meshing with spur gear 12, both planet gears being keyed to a planet shaft 17 rotatably mounted in cage plates 8 and 9. Planet gears 15 are of the same diameter as driving spur gear 11.

Exteriorly of cage plate 8 is located the "back drive" to the control mechanism. Each shaft 17 is fitted with a gear 18 meshing with an idler 19 rotatably mounted in cage plate 8, which idlers mesh with a control gear 20 on a sleeve 21 rotatably mounted on driving shaft 6.

Control gear 20 drives the control mechanism in the manner now described. A ratchet wheel 22 is rigidly mounted on sleeve 21, and through pawls 23, 23 drives (in known manner and in one direction) a worm wheel 24 rotatably mounted on sleeve 21. The worm wheel 24 drives a worm 25 secured on control shaft 26 which is carried in bearings 27, 28. A brake drum 29 is secured on shaft 26 and its rotation is controlled by a brake shoe 30 operated by a hydraulic ram 31 of conventional type.

Driving spur gear 11 is also designed for direct engagement with driven spur gear 12 to lock the gear in the direct drive condition. Driving shaft 6 is movable axially by a lever 32 pivoted at 33 to the frame, and having a finger 34 rotatably engaged between collars 35, 35 on shaft 6. When shaft 6 is moved axially it carries only the main driving gear 7 and the driving spur gear 11 with it, which latter gear is formed with dogs 36, 36 which engage in recesses 37, 37 of sleeve 13 carrying driven spur gear 12, so that these two spur gears are locked together.

The operation of the reduction gear is as follows:

Assume that the transmission gear is not locked in the direct drive condition, that clockwise torque from a prime mover is applied to the driving gear 7, and the load is coupled to clockwise driven gear 14.

The clockwise rotation of the driving shaft 6 (in the direction of arrow 41 in Fig. 1) is transmitted, by driving spur gear 11 and planetary gears 15, 15 to planetary shafts 17, 17 and planetary gears 16, 16 as an anticlockwise rotation. As driven gear 14, and hence driven spur gear 12, are coupled to the load and consequently resist rotation, the tendency of planet gears 16, 16 is to "walk" anticlockwise around spur gear 12, carrying the cage with them in the direction of arrow 42 in Fig. 1.

The anticlockwise rotation of planetary shafts 17, 17 and their attached gears 18, 18 is transmitted (through idlers 19, 19) the control gear 20 and its sleeve 21 as an anticlockwise rotation. From sleeve 21 this rotation is conveyed by the ratchet 22 and pawls 23 to the worm wheel 24, which rotates worm 25, its shaft 26 and control brake drum 29.

In this condition the cage may rotate anticlockwise in an unimpeded manner, which would result in the absence of drive to the final driven gear 14. To restrain the cage, brake 30 is adjustably applied to brake drum 29 by hydraulic ram 31. The braking required is relatively slight (and hence capable of delicate control), because of the high gear ratio between worm wheel 24 and worm 25.

As the restraint on brake drum 29 is increased, so the freedom of rotation of control gear 20 is progressively impeded. Since, however, driving spur gear 11 continues to rotate planet shafts 17, 17 and their gears 18, 18, which in turn continue to rotate idlers 19, 19, these idlers on account of this continued rotation commence to "walk" clockwise around the partially restrained control gear 20. This "walking" of the idlers commences the clockwise rotation of the cage in relation to control gear 20.

Clockwise rotation of the cage rotates driven spur gear 12, and hence the final driven gear 14, in a clockwise direction.

When the braking of drum 29, for any given load, is sufficiently increased to overcome the rotational tendency imparted to the drum by the tendency of the cage to rotate anticlockwise, the drum and control gear 20 become locked and hence all rotation of the idlers 19, 19 is expended in "walking" around the locked control gear 20. This rotates the cage clockwise to the full extent, and the maximum clockwise rotation is imparted to driven spur gear 12 by planet gears 16, 16. This is the "top gear" condition.

It is the cage rotation itself which rotates driven spur gear 12, and the maximum (direct) drive would be attained with planet shafts 17, 17 locked in relation to the cage. As, however, these planet shafts must rotate anticlockwise in the cage to rotate idlers 19, 19 and so rotate the cage about the control gear 20, this very anticlockwise rotation of planet gears 16, 16 cause them to "walk" anticlockwise on driven spur gear 12, and so permit the latter to rotate more slowly than driving spur gear 11.

With the construction shown in the drawings where gears 18, 19 and 20 are of the same diameter, this anticlockwise rotation of planet shafts 17 consists of only one revolution in the cage per complete revolution of the cage. With a considerable difference of diameter between planet gears 16 and driven spur gear 12, the automatic top gear condition would fall short of a direct drive only by a limited extent. This difference from "direct drive" can be minimised or even eliminated by increasing the ratio of the drive from gears 18 to idlers 19, with a fixed size of control gear 20. Such increase will rotate the idlers faster, and hence rotate the cage further for each revolution of the planet shafts.

It will therefore be observed that the transmission ratio afforded by the device will automatically vary extensively as follows:

In one extreme condition where no restraint is imposed against the rotation of control drum 29 (and hence against the rotation of planet shafts 17, 17) the cage will rotate freely anticlockwise, and the gears 16 will "walk" freely anticlockwise about driven spur gear 12. In the other extreme condition wherein drum 29 is completely restrained, a very high transmission speed ratio is achieved.

In the intermediate conditions, the variable degree of restraint imposed on drum 29 determines (for any fixed load) the transmission speed ratio achieved. Conversely, with a fixed resistance to the rotation of drum 29 and a variable load, the device will automatically select the transmission speed ratio necessary to overcome the load, and will always strive to achieve the "top gear" condition because the restraint of the control drum and control gear 20 causes the cage to tend to rotate with driving spur gear 11 and hence transmit maximum rotation to driven spur gear 12 and final drive gear 14.

In the intermediate conditions: Where the load is greater than the braking force on drum 29, there will be some anticlockwise rotation of control gear 20 and of the drum and also some clockwise rotation of the cage, yielding a transmission speed ratio less than "top gear". As the load falls off, the speed of clockwise rotation of the cage is increased, and when the load is reduced below the braking force, the drum 29 and control gear 20 are halted and the "top gear" condition is achieved.

The direct drive condition, wherein the reduction gear is ineffective, is achieved by operating lever 32 to move shaft 6 axially and so engage the dogs 36 of spur gear 11 with recesses 37 of spur gear 12. In this condition the cage rotates as a unit with driving shaft 6.

The ratchet drive 22, 23 serves the purpose of precluding wasteful rotation of the control gear (worm wheel 24 and worm 25) in the direct drive condition and also when the driven shaft 13 over-runs the driving shaft 6. To limit the lowest reduction ratio available to a positive figure, it is necessary only to restrain the cage against anticlockwise rotation, as by a ratchet device similar to 22, 23. This then fixes the maximum reduction to that provided by the gears 16 to 12.

The application of the reduction gear to various uses will be obvious to those skilled in the art, and the auxiliary equipment necessary or desirable for such applications is therefore not described.

I claim:

1. A variable ratio gear drive comprising a driving shaft fitted with a driving spur gear, a driven shaft co-axial with the driving shaft but capable of rotation independently thereof and fitted with a driven spur gear, a cage rotatable co-axially with said driving and driven shafts and enveloping said spur gears, a planetary shaft rotatably mounted in said cage and providing a reduction gear connection between the driving and driven spur gears, a control gear co-axial with the driving shaft, a back drive to said control gear consisting of a gear mounted on said planetary shaft and connected to said control gear through an idler gear, a rotatable control mechanism connected to said control gear, and braking means connected to said control mechanism to impede the rotation of the control gear to cause the cage to rotate in the same sense as the driving shaft.

2. A variable ratio drive according to claim 1, in which the idler gear is rotatably mounted on the cage.

3. A variable ratio drive according to claim 1, in which the idler gear drives the control gear in the sense opposite to that of the driving gear, and including a reduction gear connection between the control gear and the control mechanism.

4. A variable ratio gear drive according to claim 1, in which the idler gear drives the control gear in the sense opposite to that of the driving gear, and including a reduction gear connection incorporating a one-way drive between the control gear and the control mechanism.

5. A variable ratio gear drive comprising a driving shaft fitted with a driving spur wheel, a driven shaft co-axial with the driving shaft but capable of rotation independently thereof and fitted with a driven spur gear, a cage rotatably mounted about said driving and driven shafts and enveloping said spur gears, two planetary shafts rotatably and symmetrically mounted in said cage non-axially with said driving and driven shafts, two gear wheels mounted on each of said planetary shafts, and connecting the driving spur gear with the driven spur gear with a reduction ratio, a control gear rotatably mounted about the driving shaft, a back drive to the control gear comprising on each planetary shaft a gear exterior of the cage and connected to the control gear through an idler gear mounted on the cage, a rotatable control member connected to and driven by the control gear, and braking means coupled to said control member.

6. A variable ratio gear drive according to claim 5, and including a detachable coupling between the driving and driven shafts.

7. A variable ratio gear drive according to claim 5, and including a detachable dog clutch coupling between the driving and driven shafts, and a lever connected to the driving shaft to engage and disengage said dog clutch connections.

HECTOR CHARLES COOMBES.

REFERENCES CITED

The following references are of record in the file of this patent:

UNITED STATES PATENTS

| Number | Name | Date |
|---|---|---|
| Re. 18,842 | Richards | May 30, 1933 |
| 694,370 | Gill | Mar. 4, 1902 |
| 1,207,767 | Kennedy | Dec. 12, 1916 |
| 2,199,993 | Hale | May 7, 1940 |

FOREIGN PATENTS

| Number | Country | Date |
|---|---|---|
| 117,125 | Germany | Feb. 1, 1901 |